United States Patent
Kirstein et al.

(10) Patent No.: US 10,850,743 B2
(45) Date of Patent: Dec. 1, 2020

(54) PARKING SYSTEM WITH INTERACTIVE TRAJECTORY OPTIMIZATION

(71) Applicant: Continental Teves AG & Co. oHG, Frankfurt (DE)

(72) Inventors: Stephan Kirstein, Rodgau (DE); Benedikt Lattke, Nidderau (DE); Stefan Lüke, Rosbach vor der Höhe (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 0 days.

(21) Appl. No.: 15/898,639

(22) Filed: Feb. 18, 2018

(65) Prior Publication Data

US 2018/0244287 A1    Aug. 30, 2018

Related U.S. Application Data

(63) Continuation of application No. PCT/DE2016/200325, filed on Jul. 18, 2016.

(30) Foreign Application Priority Data

Aug. 20, 2015   (DE) .................. 10 2015 215 918

(51) Int. Cl.
| | |
|---|---|
| B60W 50/10 | (2012.01) |
| B60W 50/14 | (2020.01) |
| B60W 30/06 | (2006.01) |
| G08G 1/16 | (2006.01) |
| G05D 1/02 | (2020.01) |
| G06F 3/0482 | (2013.01) |
| B62D 15/02 | (2006.01) |

(52) U.S. Cl.
CPC ............ *B60W 50/10* (2013.01); *B60W 30/06* (2013.01); *B60W 50/14* (2013.01); *B62D 15/027* (2013.01); *B62D 15/0285* (2013.01); *G05D 1/0212* (2013.01); *G06F 3/0482* (2013.01); *G08G 1/168* (2013.01); *B60W 2050/146* (2013.01); *B60W 2540/215* (2020.02); *G05D 2201/0213* (2013.01)

(58) Field of Classification Search
None
See application file for complete search history.

(56) References Cited

U.S. PATENT DOCUMENTS

| | | | |
|---|---|---|---|
| 6,948,792 B2 | 9/2005 | Narusawa et al. | |
| 8,489,283 B2 * | 7/2013 | Widmann | ........... B60R 1/00 180/204 |
| 9,008,890 B1 * | 4/2015 | Herbach | ........... B60W 30/00 701/26 |
| 2008/0129544 A1 * | 6/2008 | Augst | ............. B62D 15/027 340/932.2 |
| 2009/0309970 A1 | 12/2009 | Ishii et al. | |
| 2013/0046441 A1 | 2/2013 | Marczok et al. | |
| 2014/0249691 A1 * | 9/2014 | Hafner | ............ B62D 13/06 701/1 |
| 2014/0358429 A1 | 12/2014 | Shutko et al. | |
| 2017/0028970 A1 * | 2/2017 | Bales | ................... B60T 7/22 |

FOREIGN PATENT DOCUMENTS

| | | |
|---|---|---|
| DE | 102006026092 A1 | 12/2007 |
| DE | 102010061904 A1 | 5/2012 |
| DE | 102012200725 A1 | 7/2013 |
| DE | 102013213225 A1 | 1/2015 |
| JP | 2002362271 A | 12/2002 |
| JP | 2004114879 A | 4/2004 |
| JP | 2009220682 A | 10/2009 |
| JP | 2009292254 A | 12/2009 |
| JP | 2010089716 A | 4/2010 |
| JP | 2012096597 A | 5/2012 |
| JP | 2013241088 A | 12/2013 |
| JP | 2014004904 A | 1/2014 |
| WO | 2006064544 A1 | 6/2006 |

OTHER PUBLICATIONS

International Search Report and Written Opinion dated Nov. 21, 2016 from corresponding International Patent Application No. PCT/DE2016/200325.
German Search Report dated May 27, 2016 for corresponding German Patent Application No. 10 2015 215 918.3.
European Exam Report dated Mar. 5, 2019 for corresponding European application No. 16 767 136.1.
Japanese Notice of Reasons for Refusal drafted on Dec. 19, 2019 for the counterpart Japanese Patent Application No. 2018-501918.

\* cited by examiner

*Primary Examiner* — Peter D Nolan
*Assistant Examiner* — Demetra R Smith-Stewart

(57) ABSTRACT

A method and a device for determining a parking trajectory, in particular for a driver assistance system, for autonomous or partially autonomous maneuvering of a vehicle into a target parking position, is disclosed. A perspective representation of the vehicle surroundings is displayed to a user on a display device and a previously determined parking trajectory is output in the representation of the vehicle surroundings. The previously determined parking trajectory can be influenced by the user by at least one manual operator input. An adjusted parking trajectory is determined in accordance with the manual operator inputs.

9 Claims, 1 Drawing Sheet

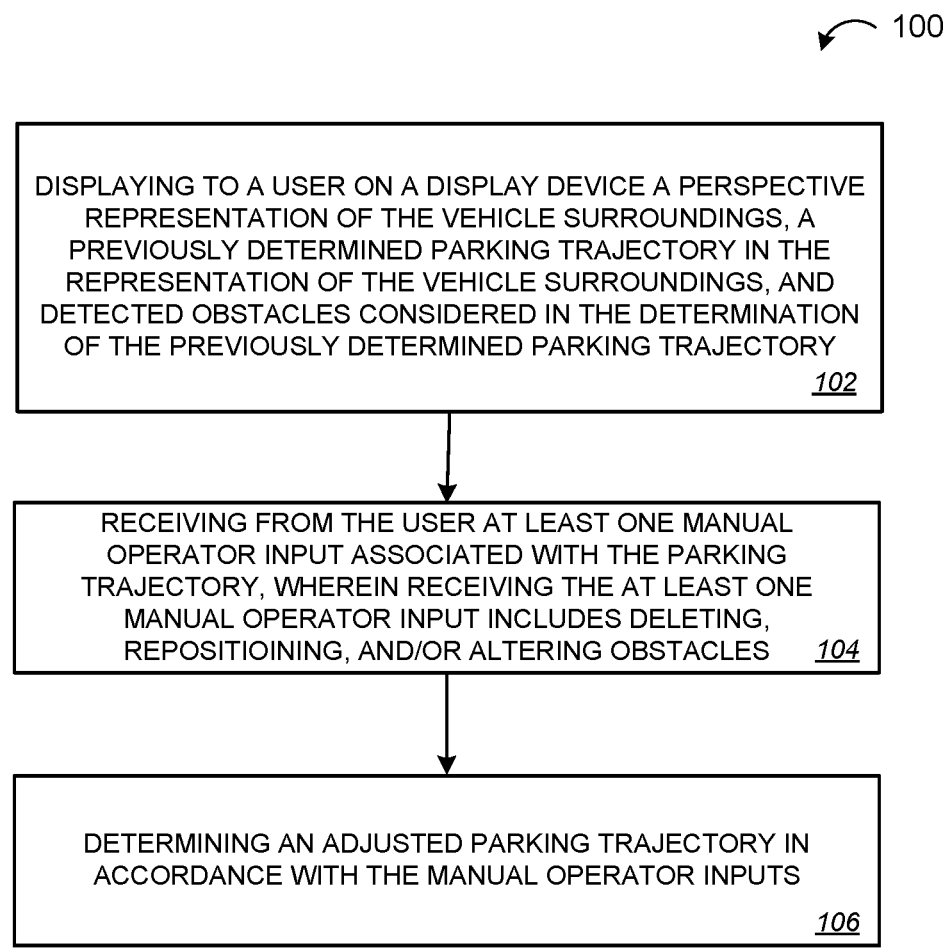

PARKING SYSTEM WITH INTERACTIVE TRAJECTORY OPTIMIZATION

CROSS REFERENCE TO RELATED APPLICATION

This application is a continuation of International application No. PCT/DE2016/200325, filed Jul. 18, 2016, which claims priority to German patent application No. 10 2015 215 918.3, filed Aug. 20, 2015, each of which is hereby incorporated by reference.

TECHNICAL FIELD

The technical field relates to a method for determining an adjusted parking trajectory for autonomous or partially autonomous maneuvering of a vehicle into a target parking position.

BACKGROUND

Systems for supporting the driver by means of autonomous or at least partially autonomous maneuvering of a vehicle into a target parking position are already known and have now become part of the special equipment of upscale vehicle classes. As a rule, steering or respectively transverse guidance support is only provided in partially autonomous systems, whereas both the transverse guidance and the longitudinal guidance of the vehicle is assumed by the system in autonomous systems.

The printed publication U.S. Pat. No. 6,948,792 B2 shows, for example, a system for parking a vehicle in a longitudinal parking space, wherein the parking space is measured, obstacles are detected and the vehicle is automatically maneuvered from a suitable starting position into a target parking position by means of a plurality of sensors arranged around the vehicle.

In the known systems, in particular in accordance with a previous capturing of obstacles in the vehicle surroundings and the previous determination of a suitable target parking position, the parking trajectory, i.e. the path on which the vehicle is guided by means of the system, is as a rule established by means of suitable path planning algorithms. In this case, the respective system determines a valid, drivable and collision-free trajectory and, depending on the system manifestation, supports the driver by means of a visual representation of the parking situation and by autonomous transverse guidance and/or longitudinal guidance of the vehicle.

In general, the starting point for implementing such a function is realistic environment capturing by means of the sensors. However, inaccuracies and errors can occur, in particular relevant obstacles or respectively objects can be incorrectly detected or not detected, during the measurement of the parking space and during the detection of obstacles. As a consequence, incorrect information is integrated into the path planning and/or missing information is not considered at all in the path planning.

For example, objects can be located around the environment of the vehicle but not be detected by the sensors used. As a consequence, these objects are not considered either in the path planning. Incorrectly detected objects etc. can, on the other hand, result in free parking spaces not being detected as such.

All in all, these disadvantages generally result in a reduction of the acceptance, in particular if, as a result of incorrect or respectively missing information, parking operations have to be aborted, if collisions occur or if, despite a sufficiently large open space, the parking function is not offered by the system.

The previously indicated missing or respectively incorrect obstacle information can, first and foremost, be caused by systemic restrictions of the selected sensor setup or as a result of various environmental influences (e.g. darkness or rain).

As such, it is desirable to present a solution for missing or incorrect obstacle information. In addition, other desirable features and characteristics will become apparent from the subsequent summary and detailed description, and the appended claims, taken in conjunction with the accompanying drawings and this background.

BRIEF SUMMARY

A method for determining a parking trajectory, for a driver assistance system, for autonomous or partially autonomous maneuvering of a vehicle into a target parking position, is disclosed. The method includes displaying to a user on a display device a perspective representation of the vehicle surroundings and a previously determined parking trajectory in the representation of the vehicle surroundings. The method further includes receiving from the user at least one manual operator input associated with the parking trajectory. The method also includes determining an adjusted parking trajectory in accordance with the manual operator inputs.

BRIEF DESCRIPTION OF THE DRAWINGS

Other advantages of the disclosed subject matter will be readily appreciated, as the same becomes better understood by reference to the following detailed description when considered in connection with the accompanying drawing wherein:

FIG. 1 is a flowchart of a method for determining a parking trajectory, according to one exemplary embodiment.

DETAILED DESCRIPTION

A method 100 for determining a parking trajectory, in particular for an assistance system, for autonomous or partially autonomous maneuvering of a vehicle into a target parking position, is described herein and shown in FIG. 1. A perspective representation of the vehicle surroundings is displayed to a user on a display device and a previously determined parking trajectory is output in the representation of the vehicle surroundings, as shown at 102. The previously determined trajectory can be influenced by the user by at least one manual operator input, as shown at 104. An adjusted parking trajectory is determined in accordance with the manual operator inputs, as shown at 106.

By utilizing the method, the user receives both feedback about the quality of the environment capturing, in particular by the display of the vehicle surroundings and the previously determined parking trajectory, and is able to directly influence the path planning, i.e. the determination of the parking trajectory. The user can, in particular, detect whether in the case of the previously determined parking trajectory all of the relevant objects or respectively obstacles have been considered in the vehicle surroundings and, if necessary, can bring about an optimized path planning, in particular in the case of missing or incorrect information, by manual operator inputs. This can significantly reduce collisions and the number of times the process is aborted during autonomous and partially autonomous parking maneuvers. In addition, the method according to the invention can mean an increase in convenience for the user. This primarily results from the fact that the user can enforce greater distances from critical obstacles. For example, the distance of the parking trajectory from a corner of an obstacle can be influenced in such a manner that a greater distance from the obstacle is observed and, as a result, the parking space can be viewed better by the user during the parking operation. Another example is the fact that it is possible for the user to influence the parking trajectory in accordance with whether the obstacles in the vehicle surroundings are solid objects (e.g. other vehicles or boundary posts) or less solid objects (e.g. bushes or plants). In such a case, the user can, for example, cause the parking trajectory to be planned at a greater distance from solid objects or respectively obstacles and/or at a lesser distance from less solid objects or respectively obstacles.

The method may, for example, be integrated into a control device of a driver assistance system of a vehicle by means of software. In particular, the parking assistance systems known from the prior art, in which parking spaces and obstacles are already captured by means of suitable sensor devices and in which a parking trajectory for an autonomous or partially autonomous parking function is determined by appropriate path planning algorithms, can be further developed according to the method.

In particular, the terminology used here, "autonomous and partially autonomous maneuvering of a vehicle into a target parking position" equally denotes "automatic or respectively partially automatic parking of a vehicle". These two terminologies are frequently used interchangeably in general parlance and are also understood to be synonymous within the framework of the present invention.

The display device, on which the vehicle surroundings are displayed and the previously determined parking trajectory is output, may be a screen inside the vehicle. In this case, this can be a screen which is additionally used to display other information to the user, in particular if no parking situation is available. Alternatively or in addition, the display device can also be a mobile display device, for example a mobile phone or a tablet PC, so that the parking situation is also displayed to the user according to the invention outside the vehicle and the user can manually influence the parking trajectory.

The user may be the driver or the operator of the vehicle.

The perspective representation of the vehicle surroundings may be a representation of the entire maneuvering area, in which the vehicle is moving during the autonomous or partially autonomous maneuvering into the target parking position. Consequently, it can involve, for example, displaying the vehicle surroundings ahead of or behind the vehicle and/or encircling the entire vehicle. The representation can be both a virtual and a real representation of the vehicle surroundings. In particular, the real representation of the vehicle surroundings denotes a representation based on image data, which have been captured by vehicle cameras. A virtual representation, in particular, denotes a computer-generated representation, which, for instance, may be used if no real image data of the vehicle surroundings are available.

In one embodiment, the vehicle surroundings are represented in the form of a plan view (bird's eye view) of the parking situation, i.e. from a virtual camera position above the vehicle. This form of representation is also referred to as a top view, surround view or bird's eye view. To this end, a camera system may be used within the framework of an exemplary embodiment of the method, which includes multiple individual cameras, which together capture the entire environment around the vehicle, i.e. multiple cameras with overlapping fields of view, which capture the front, rear and side areas of the surroundings around the vehicle. Such a camera system is, in particular, used in known surround view systems, wherein the images captured by the individual cameras are compiled by a central control device into an overall image which is, in turn, transformed and displayed to the vehicle occupants, in particular in the form of a so-called top view representation. In this case, the method according to the invention can use the cameras of such a surround view system and can be implemented directly in the control device of the surround view system.

The output, i.e. the representation, of the previously determined parking trajectory may be effected within the framework of the method in the form of an overlaid representation (overlay) in the displayed vehicle surroundings. The previously determined parking trajectory can either be an output trajectory, i.e. the trajectory, which was originally or respectively initially determined by the system and for which no adjustment has yet been made due to a manual operator input of the user, or a parking trajectory which has already been adjusted once or multiple times.

The manual operator input can, for example, be effected by appropriate operating elements on or respectively in the area of the display device. However, either the representation or respectively the output of the vehicle surroundings and parking trajectory and the manual operator input may be effected by the user via a touch-sensitive display device (touchscreen). In order to differentiate with respect to possible viewing angle changes of the image, movement with at least more than one finger can also be possible in one particular embodiment.

Within the framework of the method, the previously determined parking trajectory may be recalculated in accordance with or respectively taking into account the manual operator input of the user. The adjusted parking trajectory can subsequently be output to the user as a new parking trajectory in the representation of the driving surroundings. After that, the autonomous or respectively partially autonomous parking maneuver can be effected based on the adjusted parking trajectory or the user can again be presented with the possibility of adjusting the parking trajectory by a manual operator input. In the former case, the possibility of the user confirming the target position and/or the parking trajectory can, for example, be provided. In the latter case, the parking trajectory which has already been adjusted once (or even several times already) would, in turn, serve as a previously determined parking trajectory within the framework of the method.

In one particular configuration of the method, the manual operator input involves at least compressing, stretching, and/or displacing the previously determined parking trajectory. To this end, the parking trajectory can be subdivided into segments and displayed accordingly, wherein the user, for example by making an input via a touchscreen, can select and displace and/or compress or respectively stretch the segments, the latter in particular if the parking trajectory includes circular arcs or respectively circular arc segments.

In the case of a further configuration of the method, the manual operator input involves at least deleting, repositioning, and/or altering, for example displacing, waypoints of the previously determined parking trajectory. To this end, the parking trajectory can be subdivided into waypoints, for example at equal distances from each other or in accordance with obstacles or changes in directions of travel, wherein the user, for example by making an input via a touchscreen, can select and displace waypoints and/or delete individual waypoints or respectively position new waypoints.

Within the framework of the method, obstacles which have been detected with the aid of sensor devices of the driver assistance system, in which the method is used, can be highlighted for the user in the representation of the vehicle surroundings, for example by so-called highlighting or respectively by suitable overlays. As a result of this, the user can very quickly detect whether obstacles or respectively objects have been incorrectly detected or not detected at all. Based on this, the user can manually influence the parking trajectory according to the method, in order to react to obstacles which have been incorrectly detected or not detected. Within the framework of the method, it can in particular be envisaged that the user can delete individual obstacles, in particular obstacles which have been incorrectly detected as such, or that the user can manually add obstacles, in particular obstacles which have not been detected, by means of a manual operator input. The method can consequently offer the possibility of interactively inserting virtual obstacles. The insertion can, for example, be effected by simple pointing gestures, as a result of which standard objects with predefined dimensions can be positioned, or for example by simple stroke gestures, as a result of which e.g. freeform objects can be drawn and positioned. In the case of freeform objects, the user is in particular able to trace obstacles, which were not detected by the system as such, directly in the representation of the vehicle surroundings. Furthermore, it can be envisaged that the positioning of obstacles is also made possible outside the measuring range of individual sensor systems, for example, in an area which is indeed captured by the camera system and displayed in the representation of the vehicle surroundings, but which is located outside the measuring range of the distance sensors used, for example of ultrasonic sensors, and in which obstacles have therefore not yet been detected as such. The manually inserted obstacles, linked to existing sensor-based obstacle capturing, can thus be enlisted in combination for the user-optimized determination of the adjusted parking trajectory.

According to a configuration of the method, it can, furthermore, be envisaged that a manual operator input includes altering the vertical extent, i.e. the height, and/or the horizontal extent, i.e. the length and width of obstacles, in particular of virtual objects in the displayed vehicle surroundings. In this case, the virtual objects are, as previously described, preferably highlighted objects or respectively obstacles in the representation of the vehicle surroundings. In this case, the horizontal and vertical extent of the objects can additionally be represented and altered by the user by means of a manual operator input. For example, in connection with this, a curbstone which could in reality be driven over by the vehicle without any problems but which was detected by the system as an obstacle which could not be driven over, can be manually adjusted accordingly.

As a result of the manual adding, removing or changing of obstacles described previously, it is possible to correct particular obstacles, which have e.g. been detected completely incorrectly or which have been, for example, detected with the incorrect size or respectively extent, or which can potentially be driven over, in a user-controlled manner, resulting overall in an increased availability of the parking system.

As a result of adding or respectively altering obstacles, the target parking position can, in particular, also be influenced indirectly, for example in order to make it easier to get out of the vehicle or to achieve a greater distance from potentially critical obstacles.

According to another configuration of the method, the implementability of the adjusted parking trajectory is determined. In this case, the parking trajectory which is adjusted in accordance with the manual operator input can either be checked following the determination thereof or continually and, in particular, even during the manual input by the user, with regard to the implementability thereof. In this case, it may be checked whether a valid, drivable and collision-free trajectory is additionally available. Consequently, the adjusted parking trajectory may still be evaluated by the system, in order to avoid serious input errors.

Furthermore, the user may receive feedback regarding the implementability of the adjusted parking trajectory. The feedback may be provided to the user visually in the representation or respectively output of the vehicle surroundings and parking trajectory. In this case, sections of the parking trajectory can, for example, be highlighted in color, which cannot be implemented free of collision. The output to the user can, in this case, only be effected following the determination of the adjusted parking trajectory or even continually, in particular in real time during the manual operator input.

Furthermore, the manual operator input can be restricted in accordance with the implementability of the resulting adjusted parking trajectory. Accordingly, within the framework of the method, the user may only be allowed to make manual inputs which would result in a parking trajectory which can be implemented.

In one particular embodiment, the manual path correction can also be executed in a fully automatically planning system, to which the obstacles or respectively objects are known, in such a way that the color indicates freedom from collisions during the displacement.

In one particular embodiment, the possibility of moving the trajectory on the basis of the direction of travel and the pre-planned gap position is limited in advance and can only be displaced in one direction.

In one particular embodiment, the possibility of moving the trajectory is digitized, in order to only have to select a limited number of paths and to facilitate further input possibilities such as a menu button.

Furthermore, the invention comprises a device for a vehicle, in particular a driver assistance system, which is configured to implement the method according to the invention according to any one of the configurations described above.

The invention claimed is:

1. A method for determining a parking trajectory, for a driver assistance system, for autonomous or partially autonomous maneuvering of a vehicle into a target parking position, comprising:
   displaying to a user on a display device a perspective representation of the vehicle surroundings, a previously determined parking trajectory in the representation of the vehicle surroundings, and detected obstacles considered in the determination of the previously determined parking trajectory;
   receiving from the user at least one manual operator input associated with the parking trajectory; and
   determining an adjusted parking trajectory in accordance with the manual operator inputs,
   wherein receiving the at least one manual operator input includes deleting, repositioning, and/or altering obstacles.

2. The method according to claim 1, wherein the receiving the at least one manual operator input involves at least one of compressing, stretching, and/or displacing the previously determined parking trajectory.

3. The method according to claim 1, wherein the receiving the at least one manual operator input involves at least deleting, repositioning, and/or altering waypoints of the previously determined parking trajectory.

4. The method according to claim 1, wherein altering obstacles includes altering the vertical and/or horizontal extent of the obstacles.

5. The method according to claim 1, further comprising determining an implementability of the adjusted parking trajectory.

6. The method according to claim 5, further comprising outputting visual feedback regarding the implementability of the adjusted parking trajectory to the user during the manual operator input.

7. The method according to claim 5, further comprising restricting the manual operator input in accordance with the implementability.

8. The method according to claim 1, further comprising outputting multiple previously determined parking trajectories to the user in the representation of the vehicle surroundings and the at least one manual operator input includes selecting a preferred parking trajectory.

9. A driver assistance system for autonomously or partially autonomous maneuvering of a vehicle into a target parking position, comprising:
- a display device configured to display to a user a perspective representation of the vehicle surroundings, a previously determined parking trajectory in the representation of the vehicle surroundings, and detected obstacles considered in the determination of the previously determined parking trajectory;
- an input device configured to receive from the user at least one manual operator input associated with the parking trajectory, wherein receiving the at least one manual operator input includes deleting, repositioning, and/or altering obstacles; and
- a control device configured to determine an adjusted parking trajectory in accordance with the manual operator inputs.

* * * * *